Figure 1:
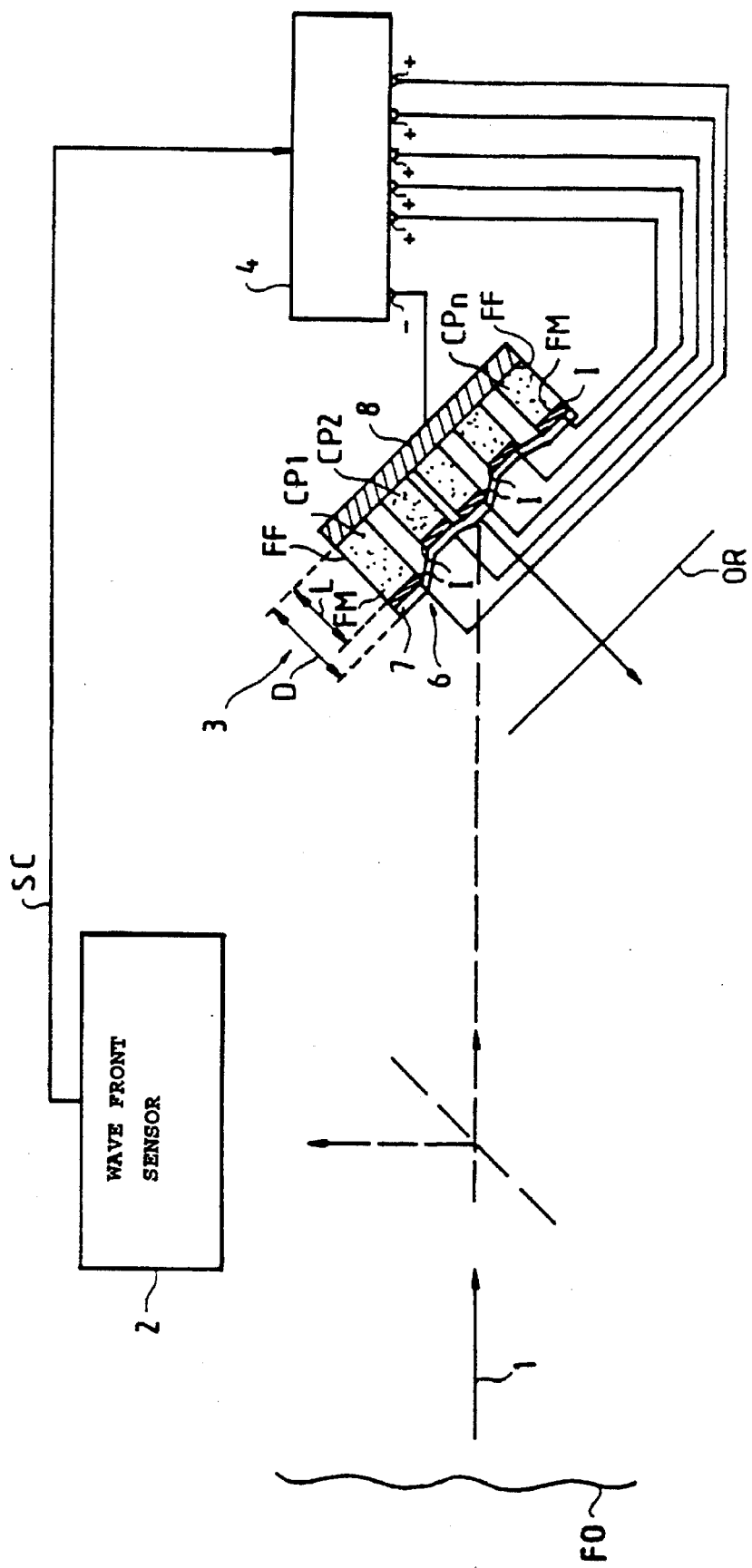

United States Patent

Huignard et al.

[11] Patent Number: 5,652,672
[45] Date of Patent: Jul. 29, 1997

[54] OPTICAL MODULATION DEVICE WITH DEFORMABLE CELLS

[75] Inventors: Jean-Pierre Huignard, Paris; Brigitte Loiseaux, Villebon S/Yvette; Claude Puech, Ballainvilliers, all of France

[73] Assignee: Thomson-CSF, Paris, France

[21] Appl. No.: 211,947

[22] PCT Filed: Oct. 30, 1991

[86] PCT No.: PCT/FR91/00857

§ 371 Date: May 2, 1994

§ 102(e) Date: May 2, 1994

[87] PCT Pub. No.: WO93/09461

PCT Pub. Date: May 13, 1993

[51] Int. Cl.⁶ ............................................. G02B 26/00
[52] U.S. Cl. ..................................... 359/292; 359/294
[58] Field of Search ............................ 359/294, 290, 359/291, 292

[56] References Cited

U.S. PATENT DOCUMENTS

| | | | |
|---|---|---|---|
| 3,001,447 | 9/1961 | Ploke | 359/294 |
| 4,013,345 | 3/1977 | Roach | 359/294 |
| 4,288,785 | 9/1981 | Papuchon et al. | |
| 4,340,272 | 7/1982 | Papuchon et al. | |
| 4,494,826 | 1/1985 | Smith | 359/294 |
| 4,543,662 | 9/1985 | Huignard et al. | |
| 4,698,602 | 10/1987 | Amitage | 359/294 |
| 4,824,216 | 4/1989 | Perbet et al. | 359/41 |
| 4,836,629 | 6/1989 | Huignard et al. | |
| 5,083,854 | 1/1992 | Zampolin et al. | 359/40 |
| 5,315,418 | 5/1994 | Sprague et al. | 359/41 |
| 5,392,140 | 2/1995 | Ezra | 359/41 |

FOREIGN PATENT DOCUMENTS 6-43481  2/1994  Japan .................... 359/294

OTHER PUBLICATIONS

Docket No. 154-1770-2 PCT, U.S. application No. 07/859,707, filed Nov. 8, 1991, now U.S. Pat. No. 5,535,041.

*Primary Examiner*—Georgia Y. Epps
*Assistant Examiner*—Thomas Robbins
*Attorney, Agent, or Firm*—Oblon, Spivak, McClelland, Maier & Neustadt, P.C.

[57] ABSTRACT

Modulation mirrors including the deformable cells (CD1 to CDn) locally modified the planarity of a reflecting surface 18. The deformable cells deform under the effect of a voltage and the control of these deformable cells is such that a control voltage $V_c$ is applied between a first and a second electrode 17, 26. A photoconductor element P1 to Pn is inserted between the second electrode 26 and the deformable cell (CD1 to CDn). A light beam (MF1 to MFn) illuminates the photoconductor element in order to obtain an elongation of the deformable cell.

18 Claims, 5 Drawing Sheets

OPTICAL MODULATION DEVICE WITH DEFORMABLE CELLS

The invention relates to an optical modulation device in which a visible or near-visible light wave is modulated spatially with the aid of a plurality of cells each deformable under the effect of an electrical voltage applied to their terminals. The invention relates more particularly to means for facilitating the control of such deformable cells.

In the present description, the expression "cells deformable under the effect of an electrical voltage" is intended to define cells which exhibit a variation in dimension as a function of a voltage which is applied to them, and cells made up of piezoelectric materials (that is to say exhibiting the inverse piezoelectric effect) should be considered as being in this category, as should cells made up from different materials, presented, for example, in the form of films and obeying different effects, whenever a deformation can also be noted in that case, especially by local variation in thickness, due to the application of a voltage.

Cells deformable under the effect of a voltage are used in various fields, and in particular in that of imagery through a turbulent atmosphere, especially in astronomy. In such cases, it may be necessary spatially to correct the phase of the optical wave front originating from the object which it is desired to observe, in order to reform a correct image of the latter.

It is known for this purpose to reflect the wave front by a mirror locally exhibiting differences with respect to a mean mirror plane; this is done so as to introduce local phase modifications and thus to compensate for the phase distortions introduced by passing through the turbulent atmosphere. Such a mirror is called "modulation mirror" in the remainder of the description.

The phase corrections to be applied to the wave front are determined by a wave front sensor system, conventional in itself, such as, for example, that which is known by the name of "HARTEMAN interferometer"; this apparatus was developed in FRANCE by the l'Office National d'Etudes et Recherches Aérospatiales (O.N.E.R.A.).

FIG. 1 diagrammatically shows a conventional installation intended to correct the phase of a wave front F O with the aid of a sensor system 2 and of a modulation mirror 3 such as defined above.

The wave front F O is propagating in the direction shown by the arrow 1 towards the modulation mirror 3 and, before arriving at the latter, it is partially deflected towards the sensor system 2. The latter delivers signals S.C. in response, relating to the phase corrections to be performed. These correction signals SC are applied to a control device 4, which itself controls the modulation mirror 3.

The wave O R reflected by the modulator mirror 3 represents the corrected wave.

It is usual to use cells made of piezoelectric materials in order to modify the planarity of the reflecting surface 6 of the modulation mirror 3, as a function of the phase corrections to be applied. A conventional configuration consists, for example, in forming the reflecting surface 6 by a flexible film 7, for example of elastomer, on which a metallized layer (not represented) is arranged, intended to form the reflecting surface 6; this film is applied by a face opposite that which constitutes the reflecting surface 6, over a surface consisting of extremities forming the movable faces FM of a number n of piezoelectric cells CP1, CP2, . . . , CPn. The opposite face or extremity of each cell constitutes a fixed face FF which is mechanically integral with a plate 8. The plate 8 may be electrically conducting and thus constitute an electrode common to all the piezoelectric cells CP1 to CPn. In this case, each of the movable faces FM includes an individual electrode I for the individual control of each piezoelectric cell; an individual electrode by the use of which each cell is fixed, for example by bonding, to the flexible film 7.

In this configuration, each piezoelectric cell plays the role of a motor: for a given point of the reflecting surface 6, the distance D between this point and the plate 8 is related to the length L of each of the piezoelectric cells which surround this point, this length itself being a function of the value of a control voltage delivered by the control device and which is applied to each of these cells. For this purpose, the control device 4 includes a voltage generator (not represented) and the plate 8 or common electrode is linked to one output of the control device 4 delivering one of the polarities of the control voltage, the negative polarity, for example, and, on the other hand, each of the individual electrodes EI is linked to an independent output delivering the positive polarity +; each independent output delivers the positive polarity + at the value appropriate to produce the desired variation in dimension of the piezoelectric cell.

It should be noted that it is also possible directly to use the set of movable faces FM to form the reflecting surface 6, and thus to dispense with the film 7. However, this may lead to increasing the number of piezoelectric cells to be installed, which, at present time, is not recommended, having regard to the means to be employed for actuating the piezoelectric cells.

In fact, so that the variations in dimension of the piezoelectric cells are significant, it may be necessary to apply to them control voltages of high values, for example of several thousands of volts in certain applications, such as the phase correction of wave fronts, or even 10,000 volts when a cell consists of a single piezoelectric bar actuated by a single voltage.

Consequently it is necessary, for each piezoelectric cell, to provide a high-voltage means in order to obtain the control voltage at the desired value, plus a high-voltage switching means in order to apply this voltage. These two means are sensitive in operation and are of a very high cost, which explains the fact that the modulator mirrors often include many fewer cells than the number which would be necessary for effective correction. Thus, for example, in the devices as described above, the piezoelectric cells are configured into an arrangement in two dimensions, that is to say forming a matrix which is usually of 5×4 deformable cells for a surface area of several tens of $cm^2$.

Moreover, these high-voltage electrical means have relatively slow response times, and in the case of the phase correction mentioned above, these response times are not always compatible with dynamic compensation for atmospheric turbulence (typically 100 HZ-1 kHz) which disturbs the optical path of astronomic or optoelectronic equipment.

The invention relates to a light modulation device in which the light is modulated with the aid of deformable cells activated by the application of an electrical voltage.

The invention constitutes a particularly useful solution to the problems of control of the deformable cells, without exhibiting the drawbacks mentioned above, both on the technical characteristics front and in terms of cost and simplicity of implementation.

It will be noted that there is known, from the Patent Application GB-A-238 880, a modulation mirror using the piezoelectric effect and photoconductors, but this is with the aid of masks which are not controllable electrically. It is also known from the U.S. Pat. No. 4,967,063 to produce mirrors which are deformable by piezoelectric effect, but without photoconductors for controlling the piezoelectric actuators.

According to the invention, a light modulation device, comprising a modulation mirror reflecting the light to be modulated with the aid of a reflecting surface, the modulation mirror including cells of the cell type which are deformable under the effect of an electrical control voltage, each deformable cell being capable of exhibiting a variation of its length as a function of the value of the control voltage and of giving rise to a local deformation of the reflecting surface, the control voltage being applied between two opposite faces of each deformable cell, one of the faces being a fixed face and the other face being a movable face, the control voltage being applied to each deformable cell by way of a photoconductor element, the said modulation device further including means for adjusting the resistivity exhibited by each photoconductor element as a function of the variation desired for the corresponding deformable cell, characterized in that the means for adjusting the resistivity of the photoconductor elements comprise a liquid-crystal screen including a plurality of liquid-crystal cells illuminated with the aid of a light source and producing, in response, a plurality of microbeams of light, each photoconductor element being illuminated by at least one microbeam.

Figure 2:
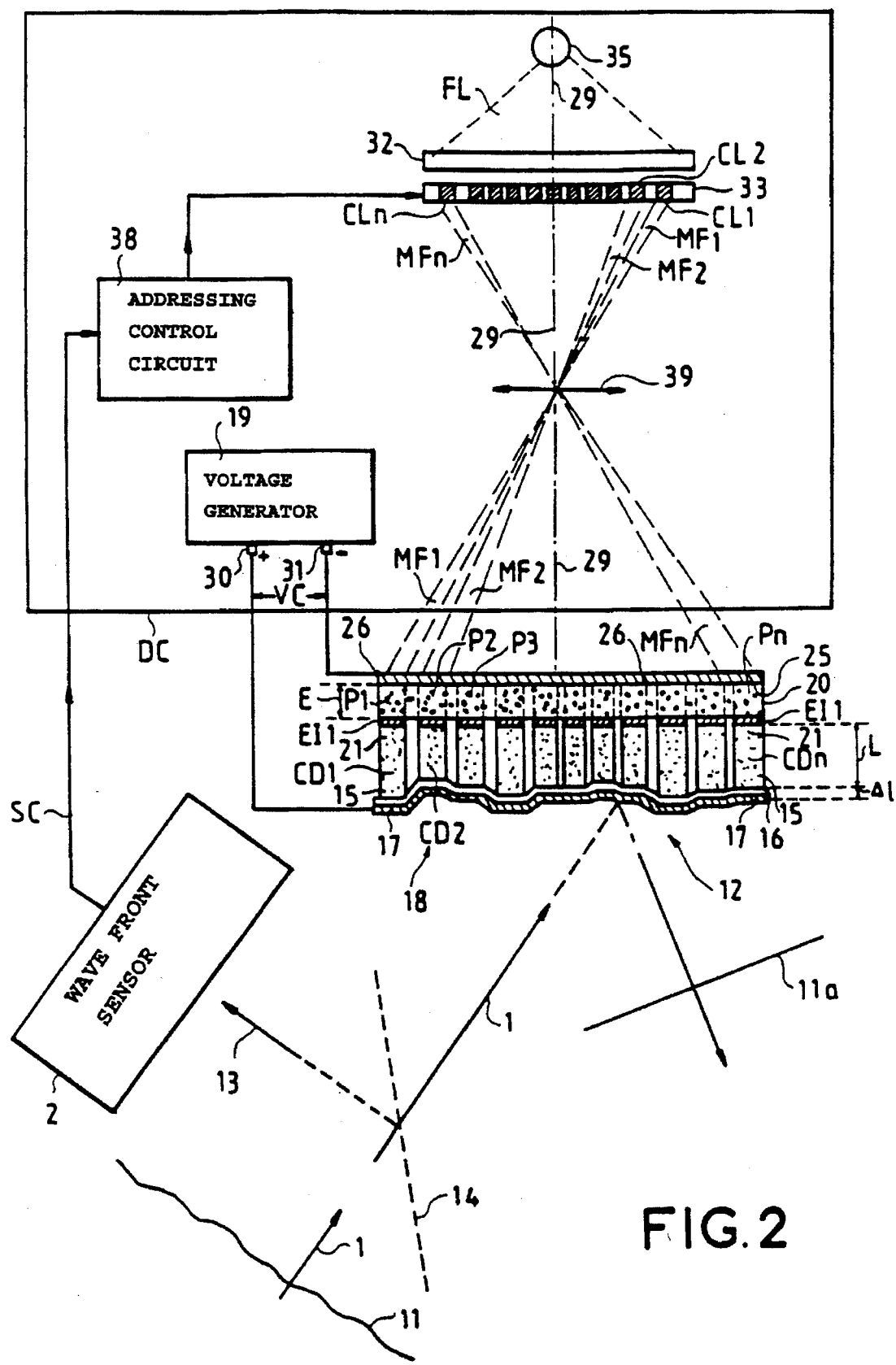
Figure 3:
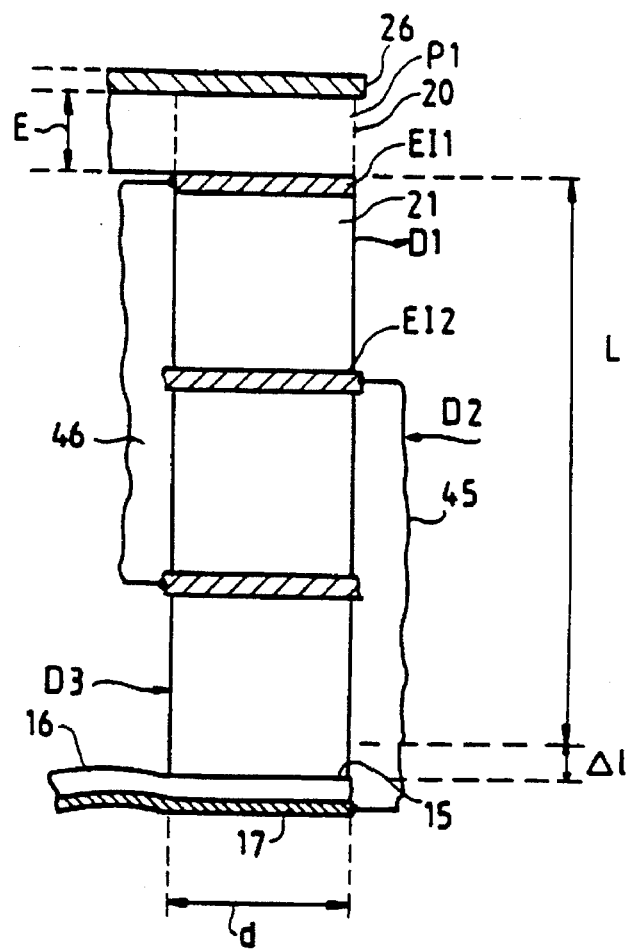
Figure 5:
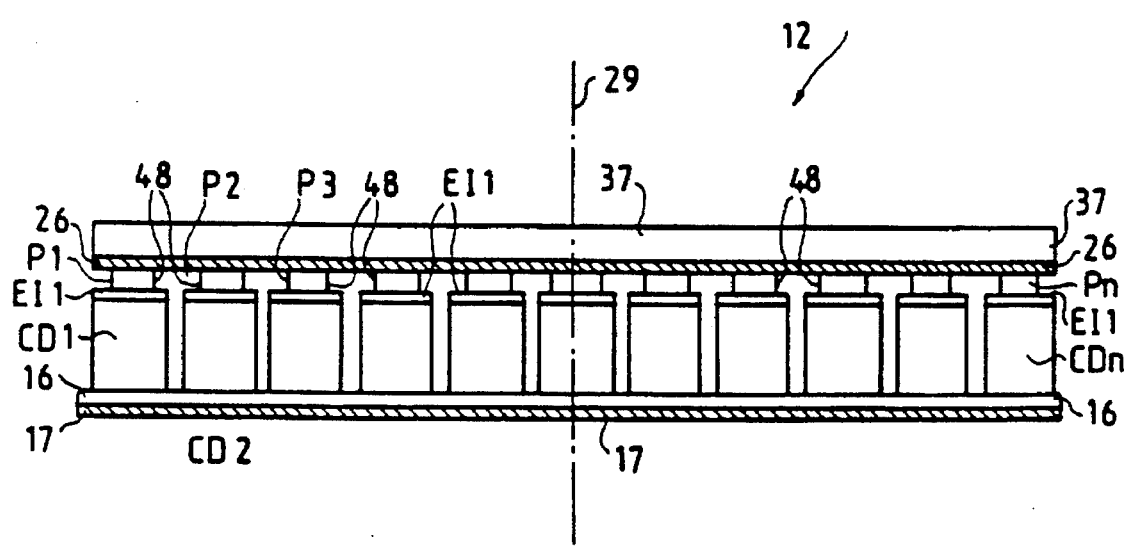
Figure 4:
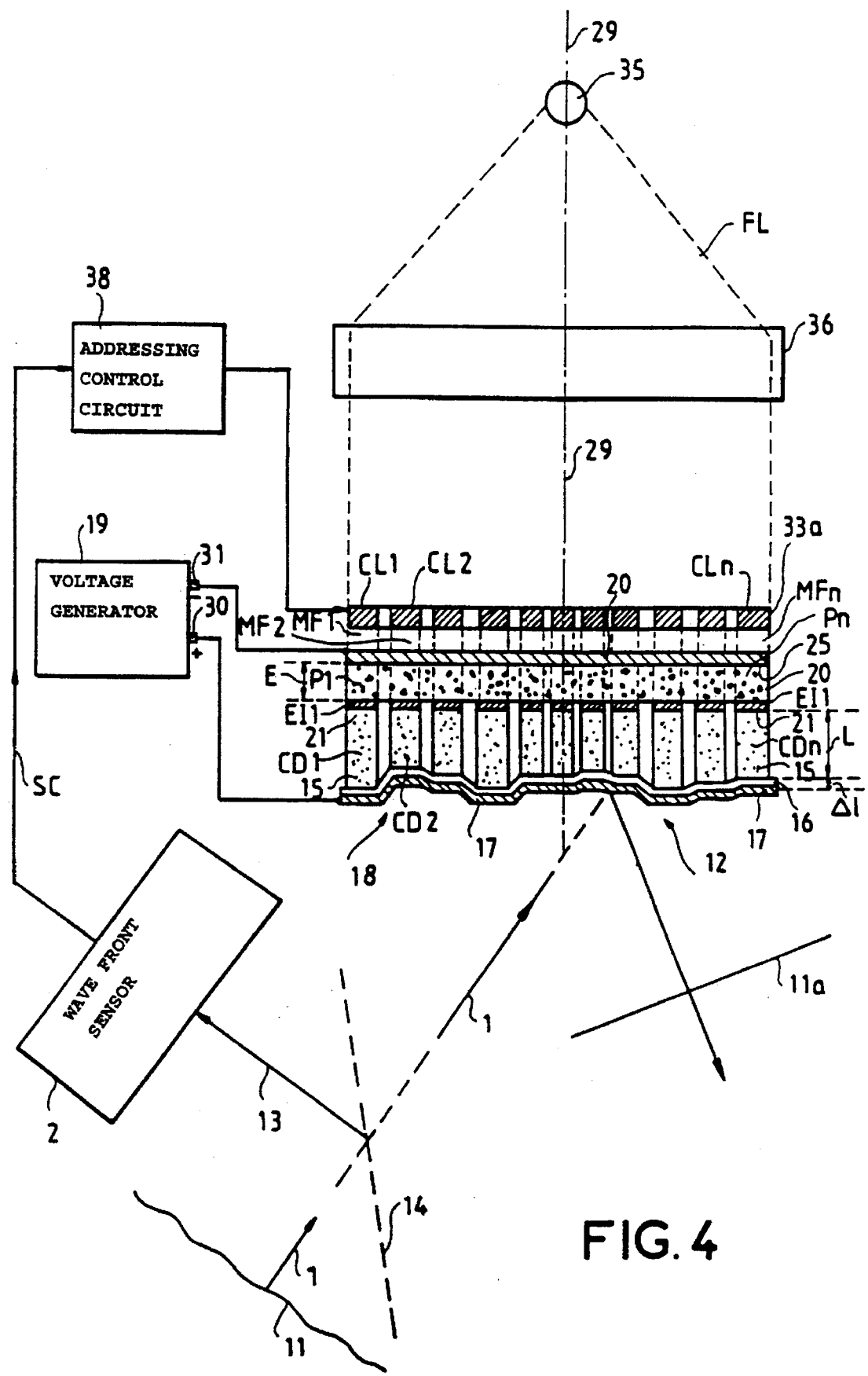
Figure 6:
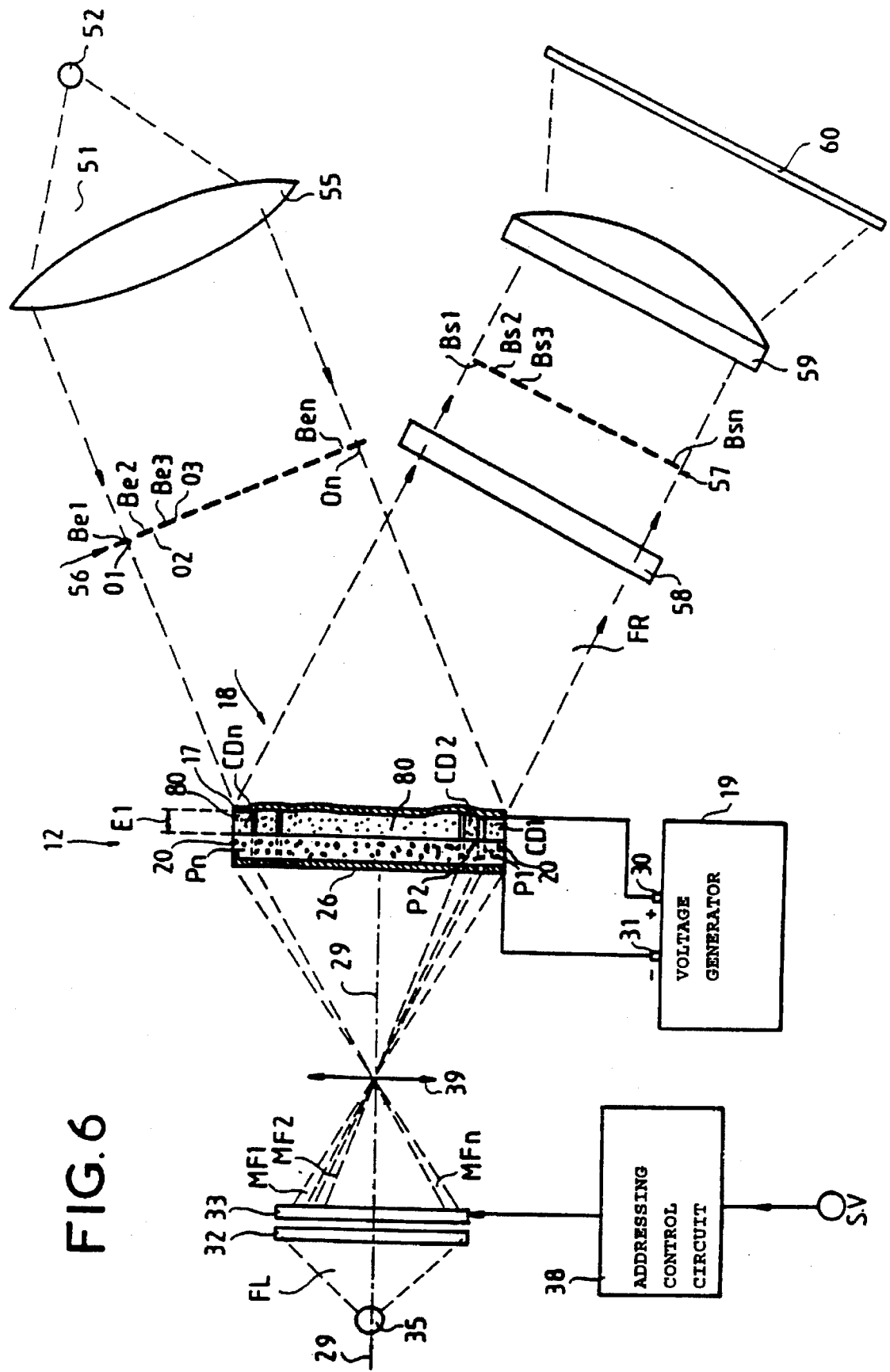

The invention will be better understood and other characteristics which it includes, as well as other advantages which it exhibits, will become apparent on reading the description which follows of some of its embodiments, this description being given by way of non-limiting example with reference to the attached drawings, among which:

the already demibed FIG. 1 represents an optical modulation device with a modulation mirror, according to the prior art, applied to the phase correction of a wave front;

FIG. 2 diagrammatically shows an optical modulation device in accordance with the invention, applied to the phase correction of a wave front;

FIG. 3 diagrammatically shows a preferred embodiment of a deformable cell shown in FIG. 2;

FIG. 4 diagrammatically shows another way of arranging a spatial light modulator shown in FIG. 2;

FIG. 5 diagrammatically shows a preferred embodiment of photoconductor elements shown in FIG. 2;

FIG. 6 illustrates one application of the invention to the projection of television type images.

FIG. 2 represents an optical modulation device 10 in accordance with the invention. In the non-limiting example of FIG. 1, the modulation device 10 makes it possible to phase-correct a wave front 11 according to a general organization similar to that already shown in FIG. 1: the wave front 11 to be corrected is propagating along the arrows I towards a modulation mirror 12; the latter fulfils the same functions as the modulation mirror 3 of FIG. 1, and it reflects a wave 11a which is the corrected wave. A part of the wave front, symbolized by an arrow 13, is diverted, with the aid of a semi-transparent mirror 14, for example, towards a wave front sensor system 2. The latter, in a conventional way, delivers correction signals SC which are applied to a control device DC which is itself intended to control the modulation mirror 12.

The modulation mirror 12 includes a plurality of deformable cells CD1 to CDn. Each deformable cell includes a front face forming a movable extremity or movable face 15. Each movable face 15 is secured to a flexible film 16, for example of elastomer.

The flexible film 16 serves to constitute a reflecting surface 18 with respect to the wave front 11. The reflecting surface 18 is centered on an optical axis 29. It is able to exhibit localized deformations of its plane under the action of the deformable cells CD1 to CDn. The reflecting surface 18 is produced by a layer 17 of an electrically conducting material, deposited on the flexible film 16 opposite the deformable cells CD1 to CDn. The thickness of the flexible film 16 is small, and it constitutes a high-value capacitance with respect to the deformable cells CD1 to CDn, in such a way that the voltage drop at the terminals of the film can be ignored, and that the electrically conducting layer 17 constitutes an electrode 17 common to all the movable faces 15. This constitutes a non-limiting example, other mountings may be adopted, for example by depositing a metallized layer on each face of the flexible film 16.

The deformable cells CD1 to CDn are of the cell type which are deformable under the effect of a voltage, as was explained in the preamble, and in the non-limiting example described these cells are of a piezoelectric material, of PZT ceramic for example, they each receive a control voltage delivered by a voltage generator 19 which the control device DC includes.

According to one characteristic of the invention, on the one hand, the control voltage is applied to each of the deformable cells CD1 to CDn by use of a photoconductor element P1 to Pn and, on the other hand, this photoconductor element is illuminated so as to adjust its resistivity, in such a way that the control voltage applied to the terminals of each deformable cell has the desired value.

In the non-limiting example described, the photoconductor elements P1 to Pn are made up in the same plate 20 of a photoconductor material. The photoconductor material must exhibit high resistivity in darkness. This photoconductor material consists, for example, of a compound of bismuth and of silicon and of oxygen $Bi_{12}SiO_{20}$, the resistivity in darkness of which is of the order of $10^{13}\Omega$-cm, whereas for incident illumination of 10 mW.cm$^{-2}$ at the wavelength of 0.514 μm, it is of the order of $10^{9}\Omega$-cm; or equally a semi-insulating S.I. Gallium Arsenide compound GaAs, the resistivity of which is of the order of $10^{9}\Omega$-cm in darkness and of the order of $10^{6}\Omega$-cm for an incident illumination of 10 mW. cm$^{-2}$.

The plate 20 of photoconductor material is applied against the deformable cells CD1 to CD2, opposite the reflecting surface 18, that is to say in contact with the rear faces 21 of these deformable cells. The deformable cells CD1 to CDn are arranged in two dimensions; they form a matrix network, the cells of which visible in FIG. 2 constitute one line, for example, and the columns of which are in a plane perpendicular to that of the figure.

One face 25 of the plate 20, opposite the deformable cells CD1 to CDn, is in contact with an electrically conducting layer forming a second electrode 26, the surface area of which is substantially the same as that of the plate 20. The second electrode 26 is thus common to all the photoconductor elements P1 to P6; the latter are represented in FIG. 2 in dotted lines in the thickness E of the photoconductor plate 20.

The electrical potential to which the second electrode 26 is taken is applied to the rear faces 21 of the cells CD1 to CDn, through photoconductor elements P1 to Pn; for a better distribution of this potential on these rear faces 25, an intermediate electrode EI1 may be interposed between each of the latter and the photoconductor elements P1 to Pn as represented in FIG. 2. All these intermediate electrodes EI1 are, needless to say, electrically insulated from one another.

In the non-limiting example represented in FIG. 2, the photoconducting plate 20 is fixed and rigid, and the rear faces 25 of the deformable cells constitute the fixed faces of the latter. Consequently, between the two faces 15, 21 of deformable cells, a modification Δ L of the length L of the latter gives rise to the same local modification of the position of the reflecting surface 18. This is made possible, on the one hand, by the flexibility of the flexible film 16 which may consist, for example, of a polymer or elastomer film and, on the other hand, by the flexibility of the first common electrode 17.

The first common electrode 17 may be produced, for example, in a way which is itself conventional, by deposition on the film 16 of a metallic conducting layer of gold or of silver for example, by thin-film technology.

The first and the second common electrodes 17, 26 are linked respectively to a first and to a second output 30, 31 of the voltage generator 19, outputs which deliver respectively the positive and negative +, − polarities of the control voltage Vc, intended to be applied to the deformable cells CD1 to CDn.

In the configuration of the invention, this control voltage Vc is applied with its maximum value between the two common electrodes 17, 26, and it is by illumination of the photoconductor plate 20 and, more precisely, of the photoconductor elements P1 to Pn that the control voltage Vc applied to each of the deformable cells CD1 to CDn is adjusted to the desired value.

To this end, the second common electrode 26 has to be transparent; it may, for example, be of tin oxide $S_nO_2$, and consist of a layer deposited on the plate 20 by a method which is in itself conventional.

In a preferred version of the invention, the illumination of the photoconductor plate 20, or more precisely the illumination of the photoconductor elements P1 to Pn, is produced with the aid of a spatial light modulator 33 which the control device DC includes, so as to perform the desired spatial distribution of the illumination.

The spatial modulator 33 may be made up, for example, with the aid of a liquid-crystal screen especially of the active-matrix type, or equally of the ferroelectric type. The techniques employed for these screens are identical to those developed for visual display screens. Thus, the spatial modulator 33 may include a liquid-crystal screen of the active-matrix type with TFT transistor, (TFT for Thin Film Transistor), including a matrix of liquid-crystal cells CL1 to CLn, the number of which may, for example, be 128×128 or may even go as far as 1024×1024, with a number of grey levels lying, for example, between 10 and 30 and a video rate of the order of 40 ms. In such a case, each liquid-crystal cell CL1 to CLn may correspond to a photoconductor element P1 to Pn, the number of grey levels being sufficient to produce fine modulation of the illumination. However, in the case of a ferroelectric liquid-crystal matrix, the equivalent of variable illumination may be obtained by modulating the number of liquid-crystal cells addressed and projected onto a given photoconductor element P1 to P2; put another way, in this case several liquid-crystal cells may be allocated to the illumination of each photoconductor element.

The control device DC further includes a light source 35 situated on the optical axis 29 and which produces a light corresponding to the range of sensitivity of the photoconductor material constituting the plate 20. This light may be non-coherent, produced, for example, by a network of fluorescent minitubes (not represented) or by a halogen lamp. However, if it is worthwhile, the source 35 may include a continuous laser emitting in the range of sensitivity of the photoconductor.

The light beam FL produced by the source 35 is collected by a condenser 32, then it next passes through the spatial modulator 33 which is also centered on the optical axis 29. In the non-limiting example of the description, the spatial modulator 33 includes as many elementary cells CL1 to CLn as there are photoconductor elements P1 to Pn, and the light beam FL emerges from the spatial modulator 33 in the form of as many micro-beams MF1 to MFn which pass through an objective 39, and the intensity of which is a function of the opacity level of the elementary cell or liquid-crystal cell CL1 to CLn traversed.

The degree of opacity, or conversely the degree of transmission by the elementary cells CL1 to CLn is controlled by an operation which is in itself conventional of addressing each elementary cell, by a traditional addressing control circuit 38, performing matrix-type addressing on the basis of the control signals SC delivered by the wave front sensor 2.

In such a case the addressing is of matrix type, in such a way that, by the use of the spatial modulator 33 and of the photoconductor elements P1 to Pn, the control, that is to say the addressing, of the deformable cells CD1 to CDn is also of matrix type, which considerably simplifies the control and interconnection of these deformable cells.

The operation is as follows:

The control voltage Vc, delivered by the voltage generator 19, is applied between the two common electrodes 17, 26 with its maximum value.

To each deformable cell CD1 to CDn a photoconductor element P1 to Pn corresponds, capable of being illuminated by a microbeam MF1 to MFn. Each microbeam MF1 to MFn is modulated in intensity as a function of the degree of opacity of the liquid-crystal cell CL1 to CLn which it has passed through, and thus each liquid-crystal cell CL1 to CLn or elementary cell corresponds to a defined photoconductor P1 to Pn.

The resistivity of the photoconductor material in darkness is sufficiently high that, in the absence of illumination, no voltage is applied to the deformable cells CD1 to CDn (that is to say to the piezo motors). Under local illumination of the photoconductor by the spatial light modulator 33, the local conductivity of the photoconductor (that is to say of the illuminated photoconductor element P1 to Pn) increases, and the control voltage Vc is applied to the corresponding deformable cell CD1 to CDn.

Thus, for example, if the state of the first elementary cell CL1 is such that it lets through a microbeam MF1, the latter illuminates the first photoconductor element P1, which results in application of the control voltage Vc to the first deformable cell CD1: the dimension of the photoconductor element P1 corresponds to the surface area illuminated by the microbeam.

The projection on the photoconductor plate 20 of an illumination distribution ΔD (x, y) induces, on the matrix of deformable cells CD1 to CDn, a spatial modulation of the applied voltage Y (x,y) of the form:

ΔV (x, y)=β. ΔI (x, y); in which β=dv/dI expresses the slope of the voltage characteristic applied on a deformable cell as a function of the illumination on the corresponding photoconductor element.

In the linear operating region of the deformable cell, an elongation Δ1 of the cell results, and a phase shift Δϕ induced on the optical wave of the form:

Δϕ=4π/λ.Δ1, where λ is the wavelength of the wave; i.e. Δϕ=(dϕ/dI)×ΔI; where dϕ/dI is the slope of the phase shift/ illumination characteristic.

In the non-limiting example described with reference to FIG. 2, the deformable cells CD1 to CDn are piezoelectric discs, the length L of which is made up with the aid of a single piezoelectric ceramic element. However, with the aim of increasing the variation in length Δ1 for the same control voltage Vc, it is possible to stack two or more piezoelectric elements so as to constitute one deformable cell CD1 to CDn.

FIG. 3, by way of non-limiting example, illustrates one way of supplying a voltage to a deformable cell, the first deformable cell CD1 for example.

In the example shown in FIG. 3, the first deformable cell CD1 is formed by three piezoelectric discs or elements D1, D2, D3 mounted end-to-end in such a way as to increase their length.

The first disc D1 is arranged against the photoconductor plate 20 (partially represented) with which it is in contact electrically by way of the first intermediate electrode EI1; the rear face of this disc D1 constitutes the fixed rear face 21 of the deformable cell CD1; the other extremity or face of this first disc D1 carries a second intermediate electrode EI2. The second disc D2 is secured by its first extremity, for example by bonding, to the second intermediate electrode EI2, and its other extremity itself bears a third intermediate electrode EI3. The third disc D3 is secured by one extremity to the third intermediate electrode EI3, and its other extremity represents the movable face 15 of the deformable cell CD1, that is to say that it is secured to the flexible film 16 which itself carries the first common electrode 17.

As in the preceding example, the control voltage Vc of maximum value originating from the voltage generator 19 is applied between the two common electrodes 17, 26, the positive + and negative − polarities being applied respectively to the first common electrode 17 and the second common electrode 26. The control voltage actually applied to the deformable cell CD1, and the value of which is adjusted with the aid of the resistivity of the photoconductor material, is that which is developed between the first common electrode 17 and the first intermediate electrode EI1.

The parallel feeding of the various discs D1, D2, D3 is achieved with the aid of two connections 45, 46, consisting, for example, of flexible wires: the first connection 45 links the first common electrode 17 (which is at the positive polarity +) with the second intermediate electrode EI2; and the second connection 46 links the first intermediate electrode EI1 (which is at the negative polarity −) to the third intermediate electrode EI3.

The example of FIG. 3 may be applied to the production of all the deformable cells CD1 to CDn. On the other hand, an arrangement similar to that shown in FIG. 3 may also be applied with a different number of discs, possibly with different interconnections if the discs are even in number.

Information is given below, by way of non-limiting example, of an illustrative embodiment in which a matrix of 32×32 deformable cells was used, each made up of a stack of three discs D1, D2, D3 as shown in FIG. 3; the deformable cells being arranged at the pitch of 5 mm and forming a surface of 150 mm×150 mm; with, for each cell, three PZT ceramic discs, the elongation $\Delta l$ of which is of the order of 0.5 µm for 1000 V, and having a diameter d of 3 mm.

The photoconductor plate 20 may be produced in $Bi_{12}SiO_{20}$, in a thickness E of 1 mm.

With an optical power for addressing the photoconductor of the order of 1 to 2 Watts, an elongation $\Delta l$ of the order of 4.5 µm in the controlled deformable cells results: i.e., a voltage applied to these cells of about 3000 volts for a maximum voltage delivered by the voltage generator 19 of the order of 4500 volts.

FIG. 4 shows one embodiment of the invention in which a spatial modulator 33a, intended to bring about the desired illumination distribution on the photoconductor elements P1 to Pn, is situated in proximity to the matrix of deformable cells CD1 to CDn. In this case, the dimensions of the spatial modulator 33 are substantially the same as those of the matrix.

The beam of light produced by the source 35 passes through a condenser 36, before passing through the spatial modulator 33a which defines microbeams MF1 to MFn; the operation is similar to that already explained by reference to FIG. 2.

It should be noted that it may be beneficial to make the photoconductor elements P1 to Pn independent of one another, especially for the purpose of achieving better electrical isolation between them.

FIG. 5, by way of non-limiting example, shows the modulation mirror 12 in a version of the invention in which the photoconductor elements P1 to Pn are independent of one another, in contrast to the example of FIG. 2 where they belong to the same plate 20 of a photoconductor material.

From a plate of a photoconductor material such as the already mentioned plate 20, or equally from a photoconductor layer carried, as in the example of FIG. 5, by a transparent support 37, made of glass for example, the plate or the photoconductor layer may be etched into the form of islands 48, by mechanical etching for example, each island or slab constituting a photoconductor element P1 to Pn. Each slab or photoconductor element P1 to Pn is secured to the first intermediate electrode EI1 of a deformable cell CD1 to CDn, as previously explained; and the transparent support 37 is, needless to say, turned towards the liquid-crystal screen 33 or 33a shown in FIGS. 2 and 4.

As in the preceding versions, all the photoconductor elements P1 to Pn are linked to the second common electrode 26. To this end, the latter is arranged between the transparent support and the slabs 48 or photoconductor elements. This leads to perfect electrical isolation between the photoconductor slabs taken to different potentials.

Control of the deformable cells CD1 to CDn, as has been described above, represents a considerable simplification with respect to the prior art. Dispensing with the electrical switching means and the parallel addressing of the set of deformable cells by two-dimensional spatial modulation of an intense light beam, in accordance with the invention, make it possible to produce and to use modulation mirrors with large surface areas and including a very high density of correction regions.

Thus, an arrangement in accordance with the invention may be applied to fields other than that of the correction of a wave front, and in particular it may be applied to producing and to projecting images of television image type.

With this aim, it is proposed to use a modulation mirror operating with the aid of an addressing similar to that described with reference to FIGS. 2, 3, 4 and 5, but used in a visual-display device.

FIG. 6 diagrammatically and by way of non-limiting example shows a modulation mirror 12 in accordance with the invention, used in a visual-display device 50 making it possible to produce and to project images of the television image type.

It should be noted that, in one application of the invention to the correction of a wave front, the variations in length of the deformable cells CD1 and CDn have to be relatively large, of the order of several micrometers. In contrast, in the application to the production of images, these variations can be much smaller, for example of the order of 0.1 µm. In consequence, it is beneficial to use a sheet of material which is deformable under the effect of an electrical voltage to produce the deformable cells CD1 to CDn, by using, for example, a piezoelectric polymer such as PVF2 or an elastomer.

It is such a version of the invention which is illustrated in FIG. 6, in which the deformable cells CD1 to CDn are produced from a sheet 80 of material being deformed under the action of a voltage applied between its faces; for example a piezoelectric polymer especially of the PVF2 type, or equally an elastomer or a viscoelastic type material.

In the case of a sheet 80 of PVF2 for example, having a thickness E1 of the order of 200 μm, an increase of this thickness of the order of 0.1 μm can be obtained, by applying to it a control voltage of the order of 3000 volts. The thickness E1 of the sheet 80 at rest represents the length L previously shown for the deformable cells CD1 to CDn; it should be noted that, in the figures, the proportions of the dimensions are not respected, for better clarity.

The sheet 80 of the material intended to form the deformable cells CD1 to CDn is secured, for example by bonding, to the plate 20 of photoconductor material, opposite the second common electrode 26. The sheet 80 is covered with an electrically conducting layer 17 which makes it possible, as in the preceding examples, to produce the first common electrode 17 and the reflecting surface 18, with the difference, however, that, in the example of FIG. 6, the conductor layer 17 is directly in contact with the deformable cells CD1 to CDn.

The reflecting 18 surface 4 of the mirror modulator 12 is intended to reflect and spatially to modulate in position a light 51 produced by a second light source 52.

In the non-limiting example described, the photoconductor elements P1 to Pn are controlled and are defined in the same way as in the example of FIG. 2, namely that:
 the light produced by the first source 35 passes through a condenser 32, then next passes through the spatial modulator 33 from which it emerges in the form of microbeams MF1 to MFn
 the microbeams MF1 to MFn then pass through an objective 39 before each illuminating a region of the plate 20 of photoconductor material, where they thus define the photoconductor elements P1 to Pn and their resistivity.

Thus, when regions intended to constitute photoconductor elements P1 to Pn are illuminated by the microbeams MF1 to MFn, a control voltage is applied locally to the sheet 80, between the first common electrode 17 and each illuminated photoconductor element, which defines a deformable cell CD1 to CDn in the thickness E1 of the sheet 80, facing each photoconductor element P1 to Pn. It is equally possible to define the dimensions of the deformable cells CD1 to CDn by arranging between the sheet 80 and the plate 20 electrically conducting surfaces such as the first intermediate electrodes EI1 shown in FIG. 2. As in the preceding examples, each photoconductor element P1 to Pn illuminated causes an increase in the length of the corresponding deformable cell CD1 to CDn, which results in a localized deformation of the reflecting surface 18.

In fact, in this application, the reflecting surface 18 of the modulation mirror 12 fulfils a function similar to that which is fulfilled by a film of oil, in a television projection device known by the name of "Eidophor".

The projection devices of the "Eidophor" type have been known for several years, especially in order to form black and white and colour television images. Their characteristics and their operation are explained especially in the article "Principles of simultaneous-Color Projection Television Using Fluid Deformation", by W. E. GLENN, which appeared in "Journal of the SMPTE" September 1970, volume 79, pages 788–794.

The article quoted above describes various ways of producing and of using deformations of the surface of the film of oil, and this article should be considered as forming part of the present description. In a projection device of the "Eidophor" type, localized deformations of the surface of a film of oil are produced. To each elementary surface of the image to be formed there corresponds a region of the film of oil, in which a deformation of the latter can be produced. Light passes through the film of oil and, in interaction with masks including opaque bars and an optical device of the "Schlieren" optical type, each deformed region generates the projection of light on a visual-display screen in the corresponding elementary image surface; the quantity of light projected onto the visual display screen is all the greater the higher the deformation.

The deformations of the film of oil are obtained with the aid of a beam of electrons modulated by video-type information and which performs a scanning of the surface of the film of oil. The charges generated by the beam of electrons produce deformations of the surface of the film of oil, via an electrostatic pressure effect.

The film of oil must be of a well controlled and constant thickness, which poses significant problems, due to the fact especially that the oil exhibits a relatively short lifetime under the effect of bombardment by electrons. Moreover, the film of oil needs to be cooled continuously.

It is thus particularly useful to produce deformations of a surface without having to subject this surface to a bombardment by electrons. Consequently, the reflecting surface 18 of the modulation mirror 12, the deformations of which, due to the deformable cells CD1 to CDn are controlled in accordance with the invention, represents a very advantageous solution, and which is made applicable industrially by virtue of the invention and especially with the addressing which is carried out as well as with the removal of the usual electrical switching means.

As taught in the article by W. E. Glenn quoted above, in the device of the invention, the light 51 to be modulated passes, in the first place, through a condenser 55, then next passes through an entry mask 56 including opaque entry bars Be1 to Ben, between which the light can pass through apertures 01 to 0n. Then the light 51 next arrives on the reflecting surface 18, by which it is reflected and forms a reflector beam FR which propagates towards a visual-display screen 60. After reflection by the reflecting surface 18, the reflected beam FR passes successively through a "Schlieren" optical device 58, an exit mask 57 including opaque exit bars Bs1 to Bsn, and through a projection objective 59 before reaching the visual-display screen 60.

The operation is of the type which is already known in the Eidophor: assuming that the reflecting surface 18 is completely planar, that is to say, for example, that all the deformable cells CD1 to CDn have their shortest length L, any light originating from the second source S2 and passing between the entry bars Be1 to Ben is blocked by the exit bars BS1 to BSn, and does not arrive at the projection objective 59.

In contrast, for the controlled light reflected at deformable cells CD1 to CDn, this light can pass between the exit bars Bs1 to Bsn. In such a case, the greater the elongation of a given deformable cell CD1 to CDn, the greater is the quantity of light which emerges from the second mask 57, that is to say from the exit bars Bs1 to Bsn, after reflection at this given deformable cell.

If it is considered that each deformable cell CD1 to CDn corresponds to an elementary surface of an image to be viewed on the projection screen 60, images, especially of television type, can easily be produced by addressing the deformable cells CD1 to CDn in a way similar to that previously described, with the aid of the liquid-crystal screen 33 for example. However, in this case, needless to say, the addressing control circuit 38, which controls the liquid-crystal screen, receives video signals SV which are themselves conventional, relating to television video images.

The operation of the visual display device of the invention, as has been described above, and whatever the embodiment of the deformable cells CD1 to CDn, applies in a simple way to forming black and white images.

However, with the device of the invention, it is also possible to produce colour images, by applying methods similar to those described in the already quoted article by W. E. GLENN: for example by using a rotary device (not represented) of filters for the three primary colours, making it possible to form the three colours sequentially; or also with a method which consists in using three monochrome projection devices, each with a different colour, and of combining the three images, or also by using light diffraction generated by the film of oil and, with the aid of an optical device of the "Schlieren" optical type, as well as an entry mask and an exit mask, in order to obtain red, blue and green colours.

This description constitutes a non-limiting example, which shows that an optical modulation device in accordance with the invention may be applied equally well to the correction of wave fronts as to producing black and white or colour images, particularly projected onto a large screen with high brightness. However, the optical device of the invention may be implemented in other applications in an advantageous way, wherever they require light to be spatially modulated.

We claim:

1. A light modulation device comprising a modulation mirror reflecting light to be modulated from a reflecting surface, the modulation mirror including cells of the cell type which are deformable under the effect of an electrical control voltage, each deformable cell being capable of exhibiting a variation ($\Delta L$) of its length (L) as a function of the value of the control voltage providing a local deformation of the reflecting surface, the control voltage being applied between two opposite faces of each deformable cell, one of the faces being a fixed face and the other face being a moveable face, the control voltage being applied to each deformable cell through a respective photoconductor element, the modulation device further including:

means for adjusting resistivity exhibited by each photoconductor element as a function of the variation ($\Delta L$) desired for the corresponding deformable cell wherein the means for adjusting the resistivity of the photoconductor elements comprise a liquid-crystal screen including a plurality of liquid-crystal cells illuminated by a source of light and producing, in response, a plurality of microbeams of light, each photoconductor element being illuminated by at least one microbeam, and a wavefront sensor system, said sensor system delivering information relating to a phase correction to be performed on a light wave reflected by the modulation mirror, the said information being applied to the means for adjusting the resistivity of the photoconductor elements.

2. Modulation device according to claim 1, wherein the deformable cells are arranged in a matrix arrangement, and in that it further includes an addressing control circuit of matrix type serving to control the deformable cells by way of the liquid-crystal screen.

3. Modulation device according to one of claims 1 or 2, wherein each deformable cell is arranged between a photoconductor element with which it is in contact via its fixed face, and a first electrode common to all the deformable cells.

4. Modulation device according to any one claims 1 or 2, wherein the photoconductor elements are arranged between the fixed face of the deformable cells and a second transparent electrode common to all the photoconductor elements.

5. Modulation device according to one of claims 1 or 2, wherein the photoconductor elements are contained in the same plate of a photoconductor material, and are individualized by an illumination of the means for adjusting the resistivity of the photoconductor elements.

6. Modulation device according to claim 5, wherein a flexible layer is interposed between the first common electrode and the movable faces of the deformable cells.

7. Modulation device according to claim 6, wherein the first electrode common to all the movable faces constitutes the reflecting surface.

8. Modulation device according to any one of claims 1 or 2, wherein the photoconductor elements are individualized and separated from one another.

9. Modulation device according to one of claims 1 or 2, wherein the control voltage of the deformable cells is applied between two electrodes, one of which is common to all the movable faces of the deformable cells and the other of which is common to the photoconductor elements, the voltage applied between these two common electrodes having a value equal to or greater than the maximum value to be applied between the two faces of the deformable cell.

10. Modulation device according to one of claims 1 or 2, wherein the deformable cells are of a piezoelectric material.

11. Modulation device according to claim 10, wherein at least one deformable cell is formed by at least two piezoelectric elements mounted end-to-end.

12. Modulation device according to claim 10, wherein the piezoelectric material is a PZT ceramic.

13. Modulation device according to claim 10, wherein the piezoelectric material is a piezoelectric polymer.

14. Modulation device according to claim 13, wherein the deformable cells consist of a sheet (80) of a polymer of a PVF2 type.

15. Modulation device according to claim 13, wherein the movable faces of the deformable cells are in contact with a first electrode common to all the movable faces and in that this common electrode constitutes the reflecting surface.

16. Modulation device according to one of claims 1 or 2, wherein the deformable cells consist of a sheet of elastomer.

17. A light modulation device comprising a modulation mirror reflecting light to be modulated from a reflecting surface, the modulation mirror including cells of the cell type which are deformable under the effect of an electrical control voltage, each deformable cell being capable of exhibiting a variation ($\Delta L$) of its length (L) as a function of the value of the control voltage providing a local deformation of the reflecting surface, the control voltage being applied between two opposite faces of each deformable cell, one of the faces being a fixed face and the other face being a moveable face, the control voltage being applied to each deformable cell through a respective photoconductor element, the modulation device further including:

means for adjusting resistivity exhibited by each photoconductor element as a function of the variation ($\Delta L$) desired for the corresponding deformable cell wherein the means for adjusting the resistivity of the photoconductor elements comprise a liquid-crystal screen including a plurality of liquid-crystal cells illuminated by a source of light and producing, in response, a plurality of microbeams of light, each photoconductor element being illuminated by at least one microbeam; and a light source and an entry mask interposed between the latter and the reflecting surface, and an optical device of the "Schlieren optics" type, and an exit mask, interposed successively between the reflecting surface and a projection screen, the light source producing light intended to be reflected and modulated by the reflecting surface so as to produce images on the projection screen, video-type information relating to the images to be produced being applied to the means for adjusting the resistivity of the photoconductor elements.

18. Modulation device according to claim 17, further including means whereby light reflected by the reflecting surface is in the form of spectral lines.

* * * * *